Patented Dec. 16, 1952

2,622,075

UNITED STATES PATENT OFFICE 2,622,075

POLYAMINE-CYANAMIDE RESINS

Hans Martin Hemmi and Paul Trefzer, Basel, Switzerland, assignors to Sandoz Limited, Basel, Switzerland, a Swiss firm No Drawing. Application December 1, 1947, Serial No. 789,134. In Switzerland December 3, 1946

9 Claims. (Cl. 260—77.5)

The present invention relates to new nitrogen-containing compounds having properties that render them particularly useful for improving the fastness properties of dyeings and printings with direct dyestuffs.

An object of this invention is to provide a process for preparing water-soluble organic nitrogen compounds, characterized in that amines of the general formula

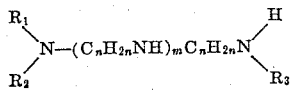

wherein $R_1$, $R_2$ and $R_3$ represent members of the group consisting of hydrogen, oxyalkyl and alkyl, $n$ being two or three and $m$ represents an integer, are condensed by splitting off ammonia at an elevated temperature with a compound selected from the group consisting of cyanamide, dicyandiamide and derivatives thereof. The expression "integer" used in the present specification and claims shall also include the number zero.

Another object of the invention is to provide a process for improving the fastness of dyeings and printings produced with direct dyestuffs by the treatment of such dyeings and printings with the above mentioned condensation product or with water-soluble salts or polyvalent metal derivatives especially copper derivatives thereof.

Still another object of the invention is to provide materials dyed or printed with direct dyestuffs which dyeings are fast to water, acid boil, wet ironing, steaming and especially to washing in neutral and alkaline medium at elevated temperatures.

Other objects will be apparent from the specification and claims.

Suitable amines of the general formula

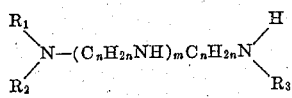

are for example diethylenetriamine, triethylenetetramine or high molecular polyethylenepolyamines, polypropylenepolyamines, di-(hydroxypropylene)-triamines or high molecular poly-(hydroxy-propylene)-polyamines, or derivatives reacting in the same way as these amines, for example, the carbamates thereof.

The final products are basic sirupy or thick, almost colourless liquids or solid substances, which with the aid of organic or inorganic acids can be converted into salts. The basic products or their water-soluble salts are suitable by themselves or in combination with water-soluble salts of the polyvalent metals such as copper, for improving the fastness properties of dyeings with substantive dyestuffs, for the preparation of pigments or for the animalisation of cellulosic fibres.

They possess furthermore the property of precipitating acid dyestuffs from their aqueous solutions.

Other methods of applying the principle of this invention may be employed instead of those explained, for it will be apparent that obvious modification thereof may be made within the skill of art without departing from the scope of the appended claims.

The preparation of the compounds described may be further illustrated by the following specific examples in which the indications can be varied within wide limits.

Example 1

146 parts of triethylenetetramine, boiling point 270–271° C., and 84 parts of dicyandiamide are placed in a vessel fitted with stirring gear and a short reflux condenser and the temperature is increased to 100–110° C., whereupon evolution of ammonia ensues. At 110° C. the mass becomes clear, and after decrease of the reaction the temperature is increased to 140° C. and maintained at that point. After 14 to 16 hours the mass is withdrawn, cooled and powdered. It can be used as such or in the form of its neutral salt, if desired together with copper salts for the improvement of the fastness of dyeings with substantive dyestuffs.

Example 2

47.5 parts of tetraethylenepentamine and 42 parts of dicyandiamide are placed in a suitable vessel fitted with stirring gear and a reflux condenser and heated with stirring. The mass foams strongly and begins to evolve ammonia at 115–125° C. The temperature is increased slowly to 140° C. and then to 160–170° C., and the whole is stirred for 6 to 9 hours, during which the mass becomes more and more viscous. The yield amounts to 75–77 parts. With the aid of this nitrogenous condensation product or with the salts thereof substantive dyestuffs for example can be after-treated for the purpose of preventing bleeding in hot baths.

*Example 3*

20.6 parts of polyethylenepolyamine, boiling point at 12 mm. over 190° C., and 16.8 parts of dicyandiamide are mixed in a suitable vessel fitted with stirring gear and maintained for 3 to 5 hours at 125–165° C. A sample should be still soluble in water. If the mass becomes too thick the stirring is stopped and the heating continued without stirring. The condensation product obtained is powdered after cooling. It can be used as such or in the form of a water-soluble salt or in the form of a copper complex.

*Example 4*

30.9 parts of diethylenetriamine, boiling point 205–207° C. are placed in a vessel fitted with stirring gear and 24.8 parts of dicyandiamide added with stirring. The product is warmed to about 100° C., whereby the material begins to evolve ammonia. The temperature is then slowly raised to 145–160° C. The originally liquid product becomes thereby more and more viscous. After 5–8 hours the reaction is interrupted and the product poured out, allowed to cool and powdered. The newly formed condensation product itself as well as its water-soluble organic or inorganic salts or metal complexes improve all the wet fastnesses of substantive dyestuffs, in particular the fastness to washing in alkaline soap and soda baths.

*Example 5*

51.5 parts of diethylenetriamine and 82 parts of dicyandiamide are placed in a vessel fitted with stirring gear. It is warmed, and at a temperature of 100° C. ammonia begins to evolve, this evolution becoming increasingly strong with increasing temperature. The temperature is raised to 135–180° C. within 4–8 hours. Thereupon the mass which is then only movable with the most powerful stirring gear is emptied out and powdered after cooling. It has similar properties to the substance prepared according to Example 4.

*Example 6*

20.4 parts of diethylenetriamine, boiling point 205–207° C. and 16.8 parts of cyanamide, melting point 38–42° C., are introduced into a vessel fitted with stirring gear and a reflux condenser and gradually warmed. The temperature increases rapidly and by regulating the heating, or by cooling if necessary, the reaction is kept under control. At 60–70° C. evolution of ammonia begins, and the temperature is then gradually increased to 130–150° C. and finally to about 170° C. The process is concluded after 10 hours. The thick viscous liquid product is poured out and after cooling is powdered. It can be used in the form of a water-soluble salt of an organic or inorganic acid or if desired in the form of a water-soluble complex of a polyvalent metal, e. g. a copper complex, for the improvement of the fastness of dyeings of textile materials with substantive dyestuffs.

Instead of cyanamide, dicyandiamide can be used with the same result. For the conversion of the base obtained into a water-soluble salt the following process can be used.

50 parts of the base are powdered and made into paste with 40 parts of water at 30° C. 18.5 parts of sulfuric acid (d.=1.84) are diluted with 20 cc. of water and cooled. This acid is added with good stirring to the paste containing water. The temperature of neutralisation should not exceed 50° C., and if desired it is controlled by the addition of ice. When the neutralisation is finished it is stirred for a further hour, and the whole is evaporated to dryness in a vacuo at 70–90° C. A water-soluble powder is thus obtained.

Instead of sulfuric acid an equivalent quantity of any mono- or polybasic acid can be used, such as hydrochloric acid, phosphoric acid, citric acid, tartaric acid, itaconic acid, etc.

*Example 7*

45 parts of diethylenetriamine and 37.8 parts of dicyandiamide are placed in a vessel fitted with stirring gear and the whole maintained at a temperature of 107–157° C. for 6–8 hours, cooled and ground. If 45 parts of the product thus obtained are dissolved in 200 parts of water and neutralised with 27 parts of 36.5 per cent hydrochloric acid and 15 parts of hydrated copper sulfate in 60 parts of water added thereto, there is obtained a turbid solution of the copper complex, which is evaporated to dryness in the usual manner and gives a water-soluble green powder which renders substantive dyeings on textiles fast to washing and to light.

*Example 8*

51.5 parts diethylenetriamine and 45 parts of guanidine carbonate are placed in a vessel fitted with stirring gear, a reflux condenser and a thermometer, the product stirred and the whole, after decrease of the evolution of ammonia, which begins at 130° C., slowly warmed to 140–150° C. After the mass has been maintained for 5 hours at this temperature, the reaction is completed and the mass, as long as it is still fluid, can be poured out. It solidifies and can be ground. The water-soluble substance can form salts and can also, if desired, be combined with derivatives of polyvalent metals to form complexes. Both the base itself as well as the salt or metal complex have the property of fixing substantive dyestuffs fast to washing.

*Example 9*

177 parts of phenylbiguanide and 103 parts of diethylenetriamine are mixed in a vessel fitted with stirring gear and reflux condenser. After decrease of the ammonia evolution, which evolution begins at 110° C., the whole is then heated slowly to 140–160° C. and maintained at this temperature during 5–8 hours. The originally thin-fluid mass becomes thereby evermore viscous, but remains easily stirrable. After 6 hours the process is stopped and the yellowish mass is poured on the sheet iron. It solidifies in the cold and can be very readily powdered.

The powder thus obtained is in itself only slightly soluble in water. It has basic properties and by conversion into its chloride becomes more soluble in water. The base as well as its salts are suitable as such or together with water-soluble copper salts for the improvement of fastnesses of substantive dyeings.

*Example 10*

176 parts of di-para-di-biguanido-diphenyl is mixed with 103 parts of diethylenetriamine with vigorous stirring in a vessel fitted with stirring gear and the whole warmed to 150–175° C. The mass slowly melts above 150° C., evolution of ammonia taking place at the same time.

The stirring of the mass is then continued for some time and finally when it has become a viscous fluid it is further heated without stirring. The process is concluded after 5–8 hours. The mass which has been puffed up by bubbles is broken out after cooling and powdered.

The powder thus obtained is dissolved by warming in water and neutralised at a temperature not exceeding 50° C. with hydrochloric acid. The neutral solution as such or after the addition of a water-soluble copper salt improves the fastness to washing and to light of substantive dyeings to an outstanding degree.

*Example 11*

66 parts of diethylenetriamine carbamate, as is obtained in a crystalline form by the introduction of carbon dioxide into an alcoholic solution of diethylenetriamine, are melted and mixed with 33.6 parts of dicyandiamide in a closed vessel fitted with stirring gear. It is then warmed during 6 hours at 140–160° C., whereby the mass becomes continuously thicker until it is finally hardly capable of being stirred. It is allowed to cool and the solidified bubble-containing product is powdered. This product is basic and can be used as such or in the form of a water-soluble salt.

The condensation products obtained according to Examples 1–11 can be used in the following manner in concentrations of 0.1–2.0 grams per litre for the improvement of the fastness properties of dyeings with substantive dyestuffs, in which either the condensation product itself or also its water-soluble salts or complexes with polyvalent metals can be used.

Viscose dyed with 2 per cent of Solar Violet BL is introduced into a solution of 0.3 grams per litre of one of the condensation products described in Examples 1–11, the ratio of the quantity of the material to the quantity of liquid in the bath being 1 to 30. The dyeing is treated at temperatures between 20° and 100° C. for 5–20 minutes with frequent moving about. The material thus after-treated can be centrifuged and dried with or without intermediate rinsing, and after-treatment at a higher temperature in certain cases improves the fastness to washing and dyeings with substantive dyestuffs to a still greater extent. Hot drying is in no way necessary as the still wet directly centrifuged material shows an excellent fastness to alkaline washing liquids without any intermediate drying.

Dyeings with other substantive dyestuffs, e. g. such as those with Solar Yellow 2GL, Solar Blue F, Solar Rubinol B, Solar Grey 2BL and Solar Grey R will be improved with the above named condensation products.

Instead of dyeings, printings prepared in the usual manner with said dyestuffs may be treated with the condensation products mentioned in the preceding examples or with soluble salts or soluble polyvalent metal derivatives thereof, in order to improve the fastness properties of these printings.

What we claim is:

1. A process for the manufacture of a water-soluble polymeric organic nitrogen compound, which comprises heating, as sole reactants, one mol of an amine of the formula $$H_2N(C_2H_4NH)_m C_2H_4NH_2$$

wherein $m$ is a positive integer, with two equivalents of a compound selected from the group consisting of monomeric and dimeric cyanamide until ammonia is evolved and then raising the temperature between about 125° and about 180° C. and maintaining it between these limits for several hours, whereby a polymeric condensation product is produced.

2. A process for the manufacture of a water-soluble polymeric organic nitrogen compound, which comprises heating, as sole reactants, one mol of an amine of the formula $$H_2N(C_2H_4NH)_m C_2H_4NH_2$$

wherein $m$ is a positive integer, with one mol of dicyandiamide to a temperature of about 100° to about 125° C. whereby ammonia is evolved and then maintaining the temperature at about 125° to about 180° C. for several hours, whereby a polymeric condensation product is produced.

3. A process for the manufacture of a water-soluble polymeric organic nitrogen compound, which comprises heating, as sole reactants, one mol of diethylenetriamine with one mol of dicyandiamide to a temperature of about 125° to about 180° C. for several hours, whereby ammonia is evolved and a polymeric condensation product is produced.

4. A process for the manufacture of a water-soluble polymeric organic nitrogen compound, which comprises heating, as sole reactants, one mol of triethylenetetramine with one mol of dicyandiamide to a temperature of about 140° C. for several hours, whereby ammonia is evolved and a polymeric condensation product is produced.

5. A process for the manufacture of a water-soluble polymeric organic nitrogen compound, which comprises heating, as sole reactants, one mol of a mixture of polyethylenopolyamines, which boils between 98° and 250° C. at a pressure of 12 mm. mercury gauge, with one mol of dicyandiamide to a temperature of about 125° to about 180° C. for several hours, whereby ammonia is evolved and a polymeric condensation product is produced.

6. As a new water-soluble organic nitrogen compound, the product obtained by heating, as sole reactants, one mol of an amine of the formula $$H_2N(C_2H_4NH)_m C_2H_4NH_2$$

wherein $m$ is a positive integer, with two equivalents of a compound selected from the group consisting of monomeric and dimeric cyanamide until ammonia is evolved and then raising the temperature between about 125° and about 180° C. and maintaining it between these limits for several hours, whereby a polymeric condensation product is produced.

7. As a new water-soluble organic nitrogen compound, the product obtained by heating, as sole reactants, one mol of diethylenetriamine with one mol of dicyandiamide to a temperature of about 125° to about 180° C. for several hours, whereby ammonia is evolved and a polymeric condensation product is produced.

8. As a new water-soluble organic nitrogen compound, the product obtained by heating, as sole reactants, one mol of triethylenetetramine with one mol of dicyandiamide to a temperature of about 140° C. for several hours, whereby ammonia is evolved and a polymeric condensation product is produced.

9. As a new water-soluble organic nitrogen compound, the product obtained by heating, as sole reactants, one mol of a mixture of polyethylenepolyamines, which boils between 98° and 250° C. at a pressure of 12 mm. gauge, with one mol of dicyandiamide to a temperature of about 125° to about 180° C. for several hours, whereby ammonia is evolved and a polymeric condensation product is produced.

HANS MARTIN HEMMI.
PAUL TREFZER.

REFERENCES CITED

The following references are of record in the file of this patent:

UNITED STATES PATENTS

| Number | Name | Date |
|---|---|---|
| 2,149,709 | Reine | Mar. 7, 1939 |
| 2,155,328 | Paquin | Apr. 18, 1939 |
| 2,208,857 | Schlock | July 23, 1940 |
| 2,213,474 | Puetzer | Sept. 3, 1940 |
| 2,214,067 | Petersen | Sept. 10, 1940 |
| 2,272,783 | Treboux | Feb. 10, 1942 |
| 2,320,225 | Ericks | May 25, 1943 |
| 2,344,259 | Morgan et al. | Mar. 14, 1944 |
| 2,362,915 | MacGregor | Nov. 14, 1944 |
| 2,366,129 | Rust | Dec. 26, 1944 |
| 2,395,857 | Foster et al. | Mar. 5, 1946 |
| 2,418,696 | Cameron | Apr. 8, 1947 |
| 2,455,896 | Nagy | Dec. 7, 1948 |
| 2,474,909 | Olpin et al. | July 5, 1949 |

FOREIGN PATENTS

| Number | Country | Date |
|---|---|---|
| 522,539 | Great Britain | June 20, 1940 |
| 546,027 | Great Britain | June 24, 1942 |